US010989118B2

(12) United States Patent
Wright et al.

(10) Patent No.: US 10,989,118 B2
(45) Date of Patent: Apr. 27, 2021

(54) CONTROLLED EVAPORATION AND HEATING OF FUELS FOR TURBINE ENGINES

(71) Applicant: Wrightspeed, Inc., Alameda, CA (US)

(72) Inventors: Ian Wright, Alameda, CA (US); Brandon Stitt, Alameda, CA (US)

(73) Assignee: WRIGHTSPEED, INC., Alameda, CA (US)

( * ) Notice: Subject to any disclaimer, the term of this patent is extended or adjusted under 35 U.S.C. 154(b) by 180 days.

(21) Appl. No.: 16/228,325

(22) Filed: Dec. 20, 2018

(65) Prior Publication Data

US 2019/0186367 A1 Jun. 20, 2019

Related U.S. Application Data

(60) Provisional application No. 62/608,143, filed on Dec. 20, 2017.

(51) Int. Cl.
*F02C 7/00* (2006.01)
*F02C 7/224* (2006.01)
(Continued)

(52) U.S. Cl.
CPC ............. *F02C 7/224* (2013.01); *F02C 3/24* (2013.01); *F02M 31/045* (2013.01);
(Continued)

(58) Field of Classification Search
CPC ........ F23R 3/16286; F23R 3/16; F23R 3/005; F23R 3/60; F23R 3/48; F23R 3/46;
(Continued)

(56) References Cited

U.S. PATENT DOCUMENTS

| 2,421,659 | A1 | 6/2011 | Sutton et al. |
| 9,003,802 | B2 | 4/2015 | Hernandez et al. |

(Continued)

FOREIGN PATENT DOCUMENTS

| RU | 2421659 C1 | 6/2011 |
| WO | 2019126434 A1 | 6/2019 |

OTHER PUBLICATIONS

International Application Serial No. PCT/US18/66683, Preliminary Report on Patentability dated Jul. 2, 205 pp.
(Continued)

*Primary Examiner* — Todd E Manahan
*Assistant Examiner* — Edwin Kang
(74) *Attorney, Agent, or Firm* — Kwan & Olynick LLP

(57) ABSTRACT

Provided are turbine engines and methods of operating thereof by heating and evaporating liquid fuels in a controlled manner prior to burning. Specifically, a fuel is heated and evaporated while avoiding coking. Coking is caused by pyrolysis when the fuel contacts a metal surface within a certain temperature range, which is referred herein to a coking temperature range. In the described methods, the fuel is transferred from one component, maintained below the coking temperature range, to another component, maintained above this range. The fuel is airborne and does not contact any metal surfaces during this transfer, and coking does not occur. In some examples, the fuel is also mixed with hot air during this transfer. The heated fuel, e.g., as an air-fuel mixture, is then supplied into a combustor, where more air is added to reach flammability conditions.

19 Claims, 11 Drawing Sheets

(51) Int. Cl.
*F02M 31/08* (2006.01)
*F02C 3/24* (2006.01)
*F02M 31/04* (2006.01)

(52) U.S. Cl.
CPC ......... *F02M 31/08* (2013.01); *F05D 2210/13* (2013.01); *F05D 2260/213* (2013.01)

(58) Field of Classification Search
CPC .... F23R 3/32; F23R 3/30; F23R 2900/00004; F02M 31/08; F02M 31/045; F02C 7/224; F02C 3/24; F05D 2210/13
See application file for complete search history.

(56) References Cited

U.S. PATENT DOCUMENTS

| | | | |
|---|---|---|---|
| 9,016,039 B2 | 4/2015 | Stoia et al. | |
| 9,366,432 B2 | 6/2016 | Mitchell et al. | |
| 2002/0144664 A1 | 10/2002 | Haldeman, III | |
| 2010/0229556 A1* | 9/2010 | Dinu | F23R 3/32 60/734 |
| 2010/0251720 A1* | 10/2010 | Pelletier | F23D 11/107 60/740 |
| 2010/0307161 A1* | 12/2010 | Thomson | F23R 3/28 60/748 |
| 2015/0204244 A1* | 7/2015 | Williams | F23K 5/04 60/776 |
| 2019/0126434 A1 | 5/2019 | Wehrmann | |
| 2019/0186367 A1 | 6/2019 | Wright et al. | |

OTHER PUBLICATIONS

Int'l Application Serial No. PCT/US18/66683, Int'l Search Report and Written Opinion dated Apr. 4, 2019, 6 pgs.

\* cited by examiner

CONTROLLED EVAPORATION AND HEATING OF FUELS FOR TURBINE ENGINES

CROSS-REFERENCE TO RELATED APPLICATIONS

This application claims the benefit under 35 U.S.C. § 119(e) of U.S. Provisional Patent Application 62/608,143, entitled: "Controlled Evaporation of Liquid Fuels for Turbine Engines", filed on Dec. 20, 2017 which is incorporated herein by reference in its entirety for all purposes.

BACKGROUND

A turbine engine is a specific type of internal combustion engines that typically has a high power-to-weight ratio and very few moving parts in comparison, for example, to a piston engine. Furthermore, turbine engines can run on almost any liquid or gas fuel. These advantages have led to wide adoption of turbine engines for aircraft, ship, and electrical generators. In some instances, turbine engines have almost complete displaced piston engines. At the same time, turbine engines are not used for automotive applications. One reason is high operating speeds of turbine engines, which complicates direct integration into mechanical drivetrains. Furthermore, turbine engines have a slow throttle response, which is not useful for dynamic driving conditions of a typical car. Finally, turbine engines are generally inefficient when operating at low power levels.

A recent widespread adoption of automotive electrical drivetrains brought a new focus on turbine engines for range extending applications. However, unlike other current applications of turbine engines (e.g., aircraft operation and power generation), the automotive industry follows strict emission requirements around the world. Using liquid fuels, such as diesel, in turbine engines in a conventional manner typically results in high emission of nitrogen oxide and/or particulates. As such, different types of turbine engines and/or different operating regimes, such as preparation of liquid fuels, are needed in order to use the turbine engines in an environmentally friendly manner.

SUMMARY

Provided are turbine engines and methods of operating thereof by heating and evaporating liquid fuels in a controlled manner prior to burning. Specifically, a fuel is heated and evaporated while avoiding coking. Coking is caused by pyrolysis when the fuel contacts a metal surface within a certain temperature range, which is referred herein to a coking temperature range. In the described methods, the fuel is transferred from one component, maintained below the coking temperature range, to another component, maintained above this range. The fuel is airborne and does not contact any metal surfaces during this transfer, and coking does not occur. In some examples, the fuel is also mixed with hot air during this transfer. The heated fuel, e.g., as an air-fuel mixture, is then supplied into a combustor, where more air is added to reach flammability conditions.

In some examples, a method for controlled evaporation and heating of the fuel is provided. This fuel is used for operating a turbine engine, e.g., subsequent burning in a combustor of the engine. The method comprises flowing the fuel, e.g., in a liquid form, inside a fuel supply line. The temperature of the fuel supply line is maintained below the coking temperature range of the fuel. The method also comprises transferring the fuel from the fuel supply line to a return line through a fuel transfer gap between the fuel supply line and the return line. The temperature of the return line is maintained above the coking temperature range of the fuel. The method also comprises flowing the fuel inside the return line to an outlet in the return line. This outlet may be connected to a combustor injector.

In some examples, the temperature of the fuel is above the flash point when the fuel reaches the outlet in the return line. More specifically, the temperature of the fuel may be above the ignition temperature when the fuel reaches the outlet in the return line. Furthermore, the fuel may be substantially gas (e.g., 95% by weight or at least 99% by weight) when the fuel reaches the outlet in the return line.

In some examples, transferring the fuel from the fuel supply line to the return line comprises combining the fuel with air thereby forming an air-fuel mixture. In these examples, flowing the fuel inside the return line comprises flowing the air-fuel mixture inside the return line. The fuel concentration in the air-fuel mixture may be above the upper flammability limit (for this fuel), at least while the air-fuel mixture travels through the return line.

In some examples, the method further comprises flowing air inside a heat shield, e.g., for cooling the fuel supply line or, more specifically, for maintaining the temperature of the fuel supply line below the coking temperature range. This air may be later combined with the fuel to form the air-fuel mixture. The heat shield encloses the fuel supply line. The heat shield is connected to the return line. However, the portion of the heat shield connected to the return line is maintained at the temperature above the coking temperature range of the fuel. In some examples, a heat insulator is disposed between the heat shield and the fuel supply line.

The method may comprise burning the fuel of the air-fuel mixture in a combustor. The temperature of the return line may be maintained above the coking temperature range, at least in part, by burning the fuel in the combustor. In these examples, the return line extends through the combustor. In some examples, prior to burning the fuel (provided in the air-fuel mixture) in the combustor, the method further comprises combining the air fuel-mixture with additional air, thereby forming an additional air-fuel mixture. The concentration of the fuel in this additional air-fuel mixture within the flammability range. On the hand, the concentration of the fuel in this air-fuel mixture, prior to forming the additional air-fuel mixture, is above the flammability range. The additional air-fuel mixture is burned in the combustor. In some examples, this additional air-fuel mixture is formed in the combustor immediate prior to its burning. In some examples, the air (used to form the air-fuel mixture from the fuel), the additional air (used to form the additional air-fuel mixture from the air-fuel mixture), or both are flown in the heat shield from one or more of a diverter or a recuperator.

In some examples, burning the fuel comprises monitoring one or more exhaust parameters and controlling the flow rate of the fuel, the flow rate of the air, or the flow rate of the additional air. This control is performed based on the one or more exhaust parameters. The one or more exhaust parameters may be selected from the group consisting of the concentration of nitrogen oxide in the exhaust, the concentration of carbon monoxide in the exhaust, and the concentration of hydrocarbons in the exhaust.

In some examples, the method further comprises, prior to transferring the fuel from the fuel supply line to the return line, preheating the return line to the temperature above the coking temperature range. This preheating comprises resistive heating or, more specifically, passing an electrical current through the return line.

In some examples, the temperature of the fuel supply line is maintained below the coking temperature range at least by controlling the flow rate of the fuel in the fuel supply line. Furthermore, the temperature of the fuel supply line may be maintained below the coking temperature range further by controlling the flow rate of air inside the heat shield surrounding the fuel supply line.

Also provided is a combustor, comprising a base, a fuel supply line, a return line, and a combustor injector. The base comprises a fuel inlet and a first air inlet. The fuel supply line comprises a first supply line end, a second supply line end, and an fuel injector positioned at the second supply line end. The fuel injector of the fuel supply line is different from the combustor injector. The first supply line end is connected to the base. The fuel supply line is in fluid communication with the fuel inlet of the base. The return line comprises a first return line end, a second return line end, and a fuel-receiving opening at the second return line end. The first return line end is connected to the base. The fuel-receiving opening is facing the fuel injector and separated by a fuel transfer gap from the fuel injector. The combustor injector is in fluid communication with the return line. The combustor injector is directed at least at the return line.

The combustor further comprises a heat shield. The heat shield further comprises a first heat shield end and a second heat shield end. The heat shield encloses the fuel supply line such that the heat shield is separated from the fuel supply line by at least the heat shield gap. The heat shield is used to thermally isolate the fuel supply line and prevent excessing heating of the fuel inside the fuel supply line. The heat shield gap extends between the first heat shield end and the second heat shield end. The heat shield gap is in fluid communication with the first air inlet and with the fuel-receiving opening of the return line. The first heat shield end may be connected to the base. The second heat shield end is connected to the second return line end. In some examples, the heat shield and the fuel supply line are concentric. The heat shield may be also separated from the fuel supply line by a heat insulator. The heat insulator may directly interface the fuel supply line and wherein the heat shield gap is between the heat insulator and the heat shield.

In some examples, the return line has a spiral shape. The combustor injector may be disposed on at least one of the base or the return line. The combustor further comprises an electrical power source controllably coupled to the return line and configured to resistively heat the return line.

These and other examples are described further below with reference to the figures.

DETAILED DESCRIPTION

Figure 1A:
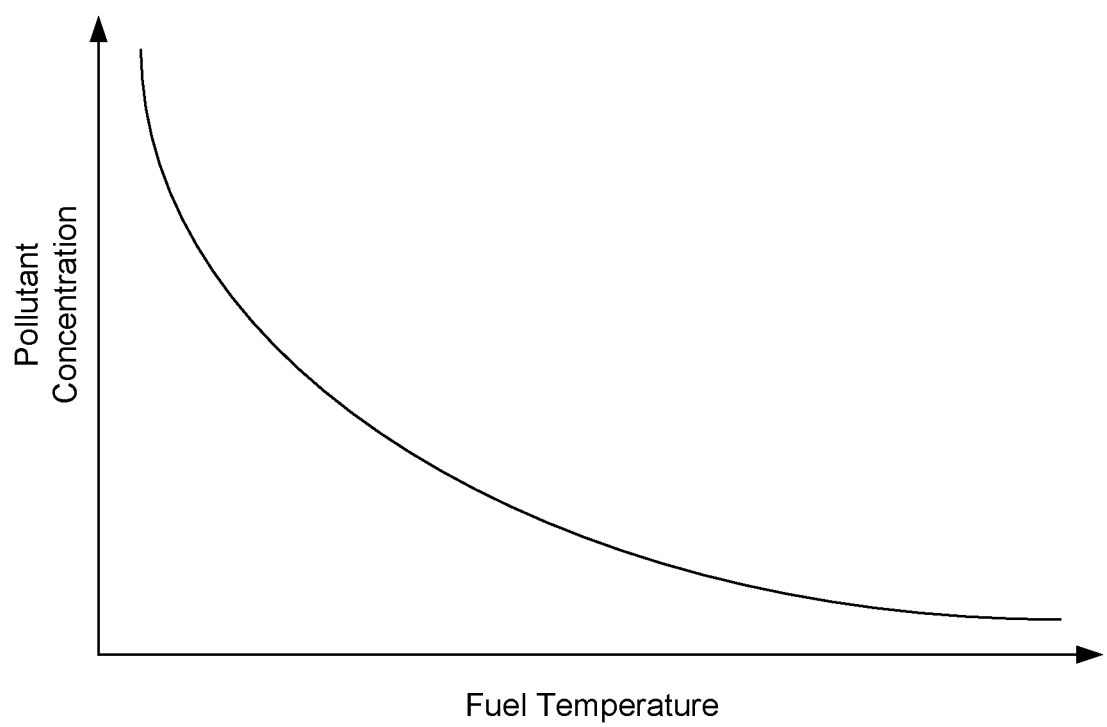
FIGS. 1A and 1B are schematic plots of pollutant concentrations for different conditions of burning liquid fluid in a turbine engine, in accordance with some examples.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Turbine engines have been used on aircraft, trains, ships, power stations, and other applications. However, turbine engines are virtually non-existent in cars, trucks, and other like ground-based vehicles due to various limitations. A brief description of a turbine engine may be helpful to understand these limitations.

A turbine engine has three main components: a compressor, a turbine, and a combustor. Ambient air flows through the compressor, which compresses the air. The compressed air is then delivered to the combustor, where fuel is added to the compressed air. The resulting air-fuel mixture is burned, thereby generating exhaust. The exhaust typically has a higher temperature and/or pressure than the compressed air. The exhaust is directed to the turbine, where the exhaust expands and rotates the turbine. It should be noted that the turbine may be used to drive the compressor (e.g., these two components may be coupled by a shaft) and other external devices, such as an electrical generator in a vehicle.

Turbine engines typically operate at high rotational speeds and within a narrow speed range, for efficiency reasons. Furthermore, turbine engines are not as dynamic as their piston counterparts. For example, changing the rotational speed of a turbine engine generally requires a lot more time than acceptable for automotive driving dynamics. As a result, various attempts to utilize turbine engines as direct mechanical drives in automotive power trains have failed, at least on a large scale.

However, turbine engines are useful as range extenders where the above-listed limitations do not present any issues. Specifically, a turbine engine may be coupled to an electrical generator, either directly or through a gearbox, e.g., preset for a particular gear ratio. In this example, the turbine engine may be operated steadily at its optimal operating conditions (e.g., speed). In this range-extending application, the vehicle dynamics are not impacted by the turbine operation.

Another issue with using turbine engines in automotive applications is strict emission requirements, applied to cars. Other applications, e.g., aircraft and ships, have must lower requirements, if any. Meeting various car emission requirements is particular challenging when liquid fuels are used in turbine engines. Yet liquid fuels, such as diesel, are particular desirable for automotive applications due to availability, storage, safety, and other considerations. For examples, when a room-temperature diesel fuel is supplied directly into a combustor a turbine engine, the exhaust can have high levels of nitrogen oxides, hydrocarbons, and/or soot particles.

Figure 1B:
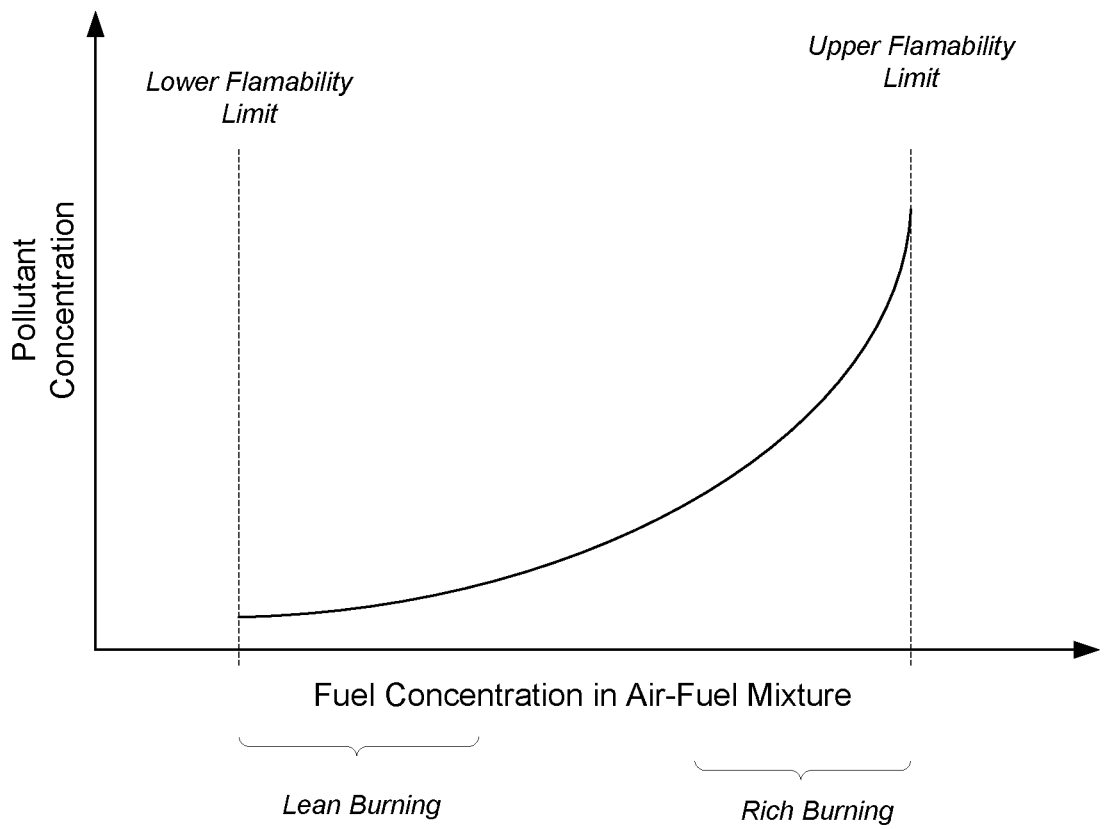

FIGS. 1A and 1B are schematic plots of general pollutant concentrations for different burning conditions when a liquid fuel is used in a turbine engine. Specifically, FIG. 1A illustrates that the pollutant level decreases rapidly with an increase in fuel temperature. Without being restricted to any particularly theory, it is believed that burning a cold fuel results in less oxidation of the fuel and, generally, much higher hydrocarbon content in the exhaust than when the fuel is preheated. The activation energy and the thermodynamics of fuel oxidation are less favorable at lower temperatures.

Furthermore, there is a substantial drop in the pollutant level when the liquid fuel is evaporated and turned into the gas fuel. First, gas molecules require much lower activation, resulting in more complete oxidation/burning. Furthermore, air-fuel mixtures are more uniform when fuels are in their gas phases rather than in liquid phases. It should be also noted that conventional turbine engines use liquid fuels directly in their combustors. In these engines, fuel evaporation is a part of the burning cycle, resulting in less efficient burning and higher pollutant concentrations. Contrary to this conventional approach, this disclosure presents methods and systems in which the liquid fuel is substantially evaporated (e.g., at least 95% by weight or at least 99% by weight) before reaching the combustor, resulting in much cleaner burning. Furthermore, heating and evaporation of liquid fuels is performed in such a way that the fuel does not contact any metal surfaces as while the fuel temperature goes through the coking temperature range.

FIG. 1B illustrates pollutant concentration as a function of fuel concentration in an air-flow mixture, supplied to a combustor. Specifically, this function indicates that the pollutant level increases with an increase in the fuel concentration of the air-fuel mixture. The combustion temperature increases with a fuel/air ratio, reaching its peak at the stoichiometric combustion. At these high combustion temperatures, some nitrogen in the air is oxidized to NOx. From the emission standpoint, it may be desirable to have lean burning, a lower combustion temperature, and low NOx production. However, burning occurs at each interface of oxygen and fuel in the air-fuel mixture, and the condition of oxygen-fuel interfaces may control whether the burning is lean or rich, not only a concentration of the fuel in the mixture. In other words, the distribution of the fuel in the mixture, at the micro-level, is another factor, controlling burning. When a liquid fuel is delivered into a combustor (even at low fuel concentrations and in the form of small droplets), the local burning at the liquid surface of these droplets may be rich since each droplet represents a local zone of a high fuel concentration. Finer dispersing of the liquid fuel (into smaller droplets) may help, to a limited extent, but the issue of burning at the liquid surface still remains. Evaporating liquid fluid eliminates this liquid interface and more uniformly distributes the fuel (now as gas molecules) in the air-fuel mixture. The evaporated fuel may be viewed as an ultimate dispersion of the fuel, i.e., at the molecular level. As such, supplying gas-phase fuels, rather than liquid fuels, into combustors of turbine engines substantially reduces pollutant concentration.

It should be noted that a fuel is capable of burning between its lower flammability limit and its upper flammability limit, which are different for different fuels. The difference between the upper and lower flammability limits may be referred to as a flammability range. The described methods and systems rely on fuel concentrations above the upper flammability limit for controlling the temperature of the fuel and evaporating the fuel. The fuel concentration is then brought within flammability limits in a combustor. It should be also noted that when a fuel is heated, the fuel passes a coking temperature range. If the temperate of the fuel is within this range and the fuel is in contact with a metal surface, the fuel may undergo pyrolysis resulting in coke depositions on the metal surface. The described methods and systems are specifically configured to avoid any contact with metal as the fuel is heated and passes through this coking temperature range.

Turbine Engine Examples

Figure 2A:
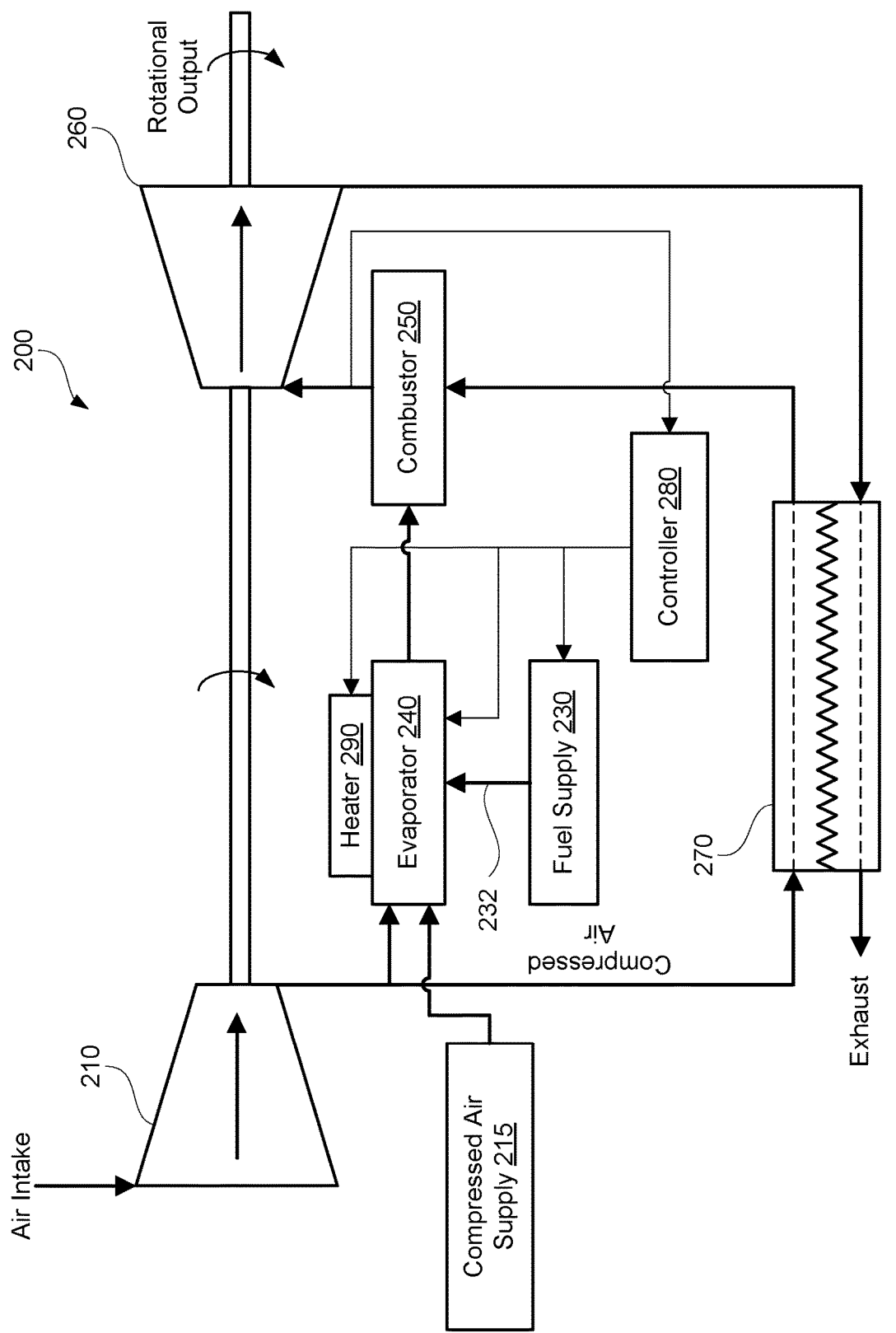
FIG. 2A is a schematic illustration of a turbine engine, comprising an evaporator and a combustor, in accordance with some examples.

FIG. 2A is a schematic illustration of turbine engine 200, in accordance with some examples. Turbine engine 200 comprises compressor 210, turbine 260, fuel supply 230, evaporator 240, and combustor 250. In some examples, evaporator 240 and combustor 250 are separate free-standing components. Alternatively, evaporator 240 and combustor 250 are integrated into the same structure.

In some examples, compressor 210 and turbine 260 are mechanically coupled by a shaft or some other means. As such, turbine 260 may be used to drive compressor 210 during operation of turbine engine 200. Furthermore, in some examples, turbine 260 is mechanically coupled and used to drive another component, such as generator 560 as described below with reference to FIG. 9.

Compressor 210 receives ambient air (e.g., from an air intake manifold) and produces compressed air. The compressed air is directed combustor 250. More specifically, a portion of the compressed air is sent through evaporator 240, where this portion is combined with fuel. Another portion (e.g., the remaining portion) is sent through recuperator 270, where this other portion is further heated. In some examples, portions of the compressed air directed from compressor 210 to evaporator 240 and recuperator 270 are variable and may be changed during operation of turbine engine 200.

In some examples, various characteristics of the compressed air (e.g., pressure, temperature, and flow rate) are controlled by controlling operation of compressor 210 (e.g., controlling the flow of ambient air into compressor 210, controlling the speed of compressor 210, and the like). Additional control is provided by evaporator 240/or recuperator 270.

Furthermore, in some examples, a separate supply of the compressed air is provided, besides compressor 210. Specifically, FIG. 2A illustrates compressed air supply 215 connected to evaporator 240. In some examples, compressed air supply 215 is a part of turbine engine 200. Alternatively, compressed air supply 215 is a separate component and is connected to turbine engine 200 during installation of turbine engine 200, e.g., on a vehicle. When present, compressed air supply 215 is used to supply compressed air to evaporator 240, e.g., when turbine engine 200 is started and compressor 210 is not operational or at least not fully operational.

Fuel supply 230 is configured to supply flue (e.g., liquid fuel) to evaporator 240. Specifically, fuel supply 230 is fluidically coupled to evaporator 240 using fuel supply line 232. In some examples, all fuel is passed through evaporator 240 during operation of turbine engine 200. Some examples of the fuel include, but are not limited to, diesel and jet fuel. In some examples, fuel supply 230 comprises a fuel tank, one or more fuel pumps, one or more pressure and/or flow regulators, and/or other like components.

Evaporator 240 is operable to receive the fuel from fuel supply 230 and to receive a portion of the compressed from compressor 210 or other source, such as compressed air supply 215. Evaporator 240 is also operable to evaporate the fuel and combine the compressed air portion with the fuel thereby forming an air-fuel mixture which is too rich to burn, in which the fuel is present in the gas phase.

Figure 2B:
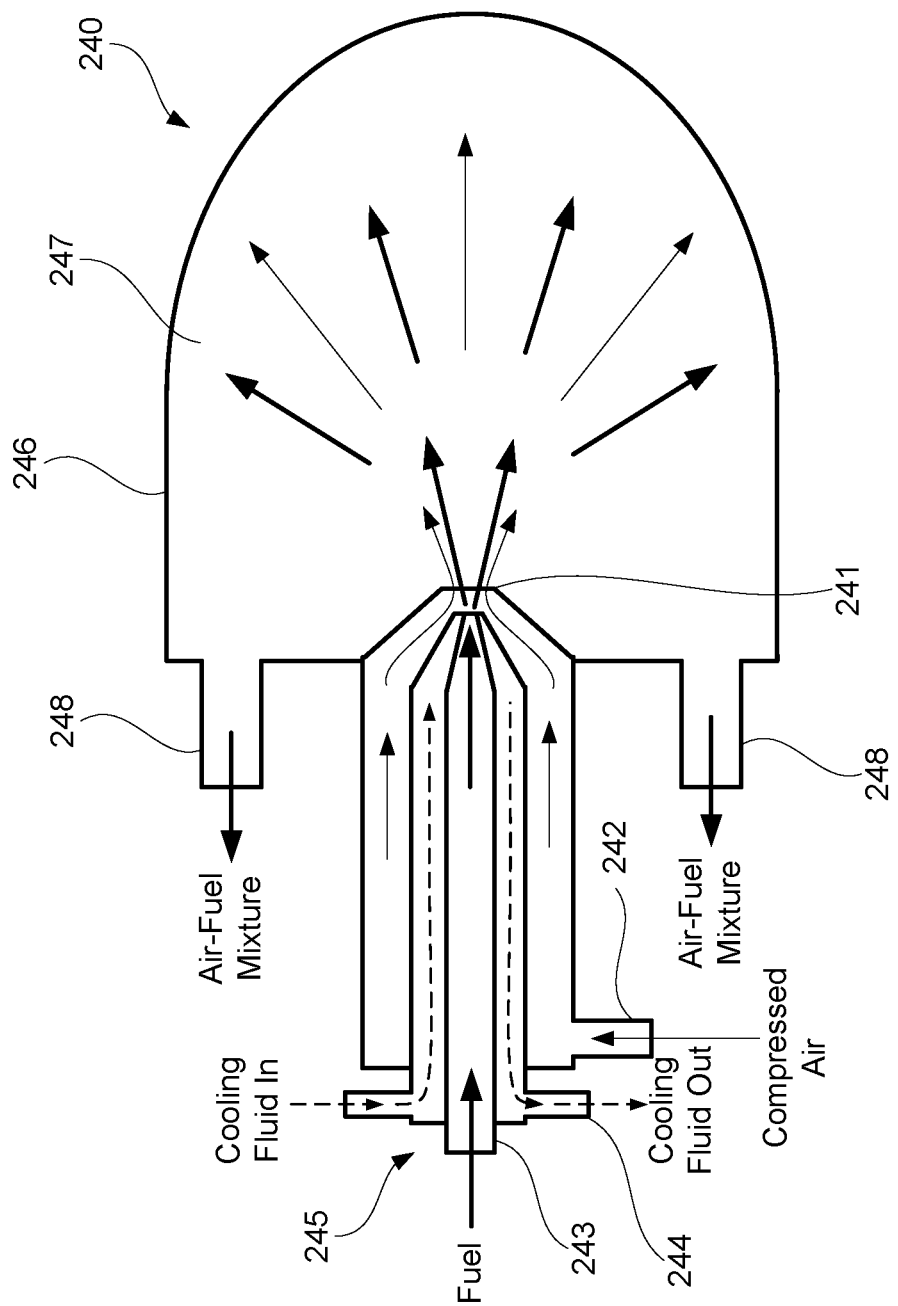
FIG. 2B is a schematic illustration of one example of an evaporator of a turbine engine, in accordance with some examples.

FIG. 2B illustrates an example of evaporator 240, for use in turbine engine 200. Evaporator 240 is specifically configured to heat fuel, flown through evaporator 240, from fuel's initial temperature, which is below the coking temperature range for this fuel, to an evaporator exit temperature, which is above the coking temperature range. Furthermore, evaporator 240 is configured to prevent contact between the fuel and other components (e.g., metal components) of evaporator 240 as the fuel goes through the coking temperature range, thereby preserving fuel's integrity and preventing coke buildups in turbine engine 200.

Specifically, evaporator 240 comprises one or more walls 246 forming interior 247 of evaporator 240 such that interior 247 is isolated from the environment by one or more walls 246. Evaporator 240 comprises fuel injector 245, configured to deliver fuel and compressed air to interior 247. Specifically, fuel injector 245 comprises compressed air inlet 242, fluidically coupled to compressor 210 or an alternate source, such as compressed air supply 215, and used to supply the compressed air into interior 247 of evaporator 240. Fuel injector 245 further comprises fuel inlet 243, fluidically coupled to fuel supply 230 and used to supply the fuel into interior 247. In some examples, fuel inlet 243 and fuel supply line 232 are the same component.

Due to the high temperature of compressed air passing through compressed air inlet 242, fuel inlet 243 is thermally isolated from compressed air inlet 242 within fuel injector 245. This thermal insulation prevents premature heating of the fuel in fuel inlet 243. As such, in these examples, the fuel is below the coking temperature range until the fuel is discharged from fuel inlet 243 into interior 247. In some examples, cooling jacket 244 is positioned between fuel inlet 243 and compressed air inlet 242. A cooling fluid is circulated through cooling jacket 244 to maintain the temperature of the fuel within a desired range, e.g., below the coking temperature range. In more specific examples, e.g., shown in FIG. 2B, compressed air inlet 242, cooling jacket 244, and fuel inlet 243 are arranged into a core-shell configuration, such that compressed air inlet 242 forms an outer shell, cooling jacket 244 forms an intermediate shell, fuel inlet 243 forms a core of this configuration.

Fuel injector 245 also comprises nozzle 241, formed by the ends of compressed air inlet 242 and fuel inlet 243 extending into interior 247 of evaporator 240. Fuel injector 245 is configured to direct the fuel at one or more walls 246 of evaporator 240. One or more walls 246 are maintained at a temperature above the coking temperature of the fuel. Furthermore, it should be noted that the fuel also heats up while the travels from nozzle 241 to one or more walls 246 due to the contact with the compressed air.

Evaporator 240 also comprises outlet 248 protruding through one or more walls 246 and in fluidic communication with interior 247. The air-fuel mixture is carried from interior 247 through outlet 248 and is delivered to other components of turbine engine 200, such as combustor 250.

Figure 3A:
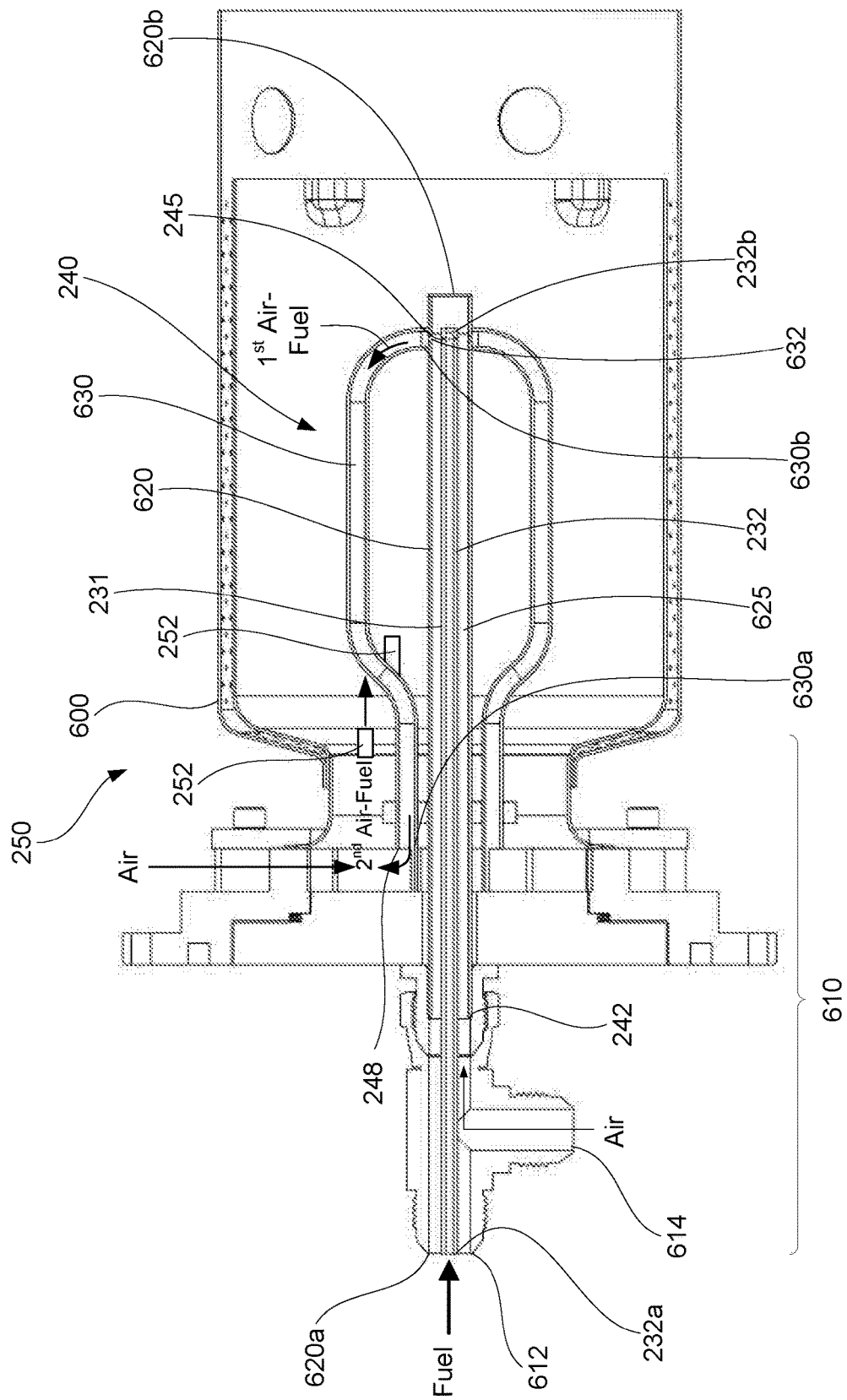
FIG. 3A is a schematic illustration of one example of a combination comprising an evaporator and a combustor for use in a turbine engine, in accordance with some examples.
Figure 3B:
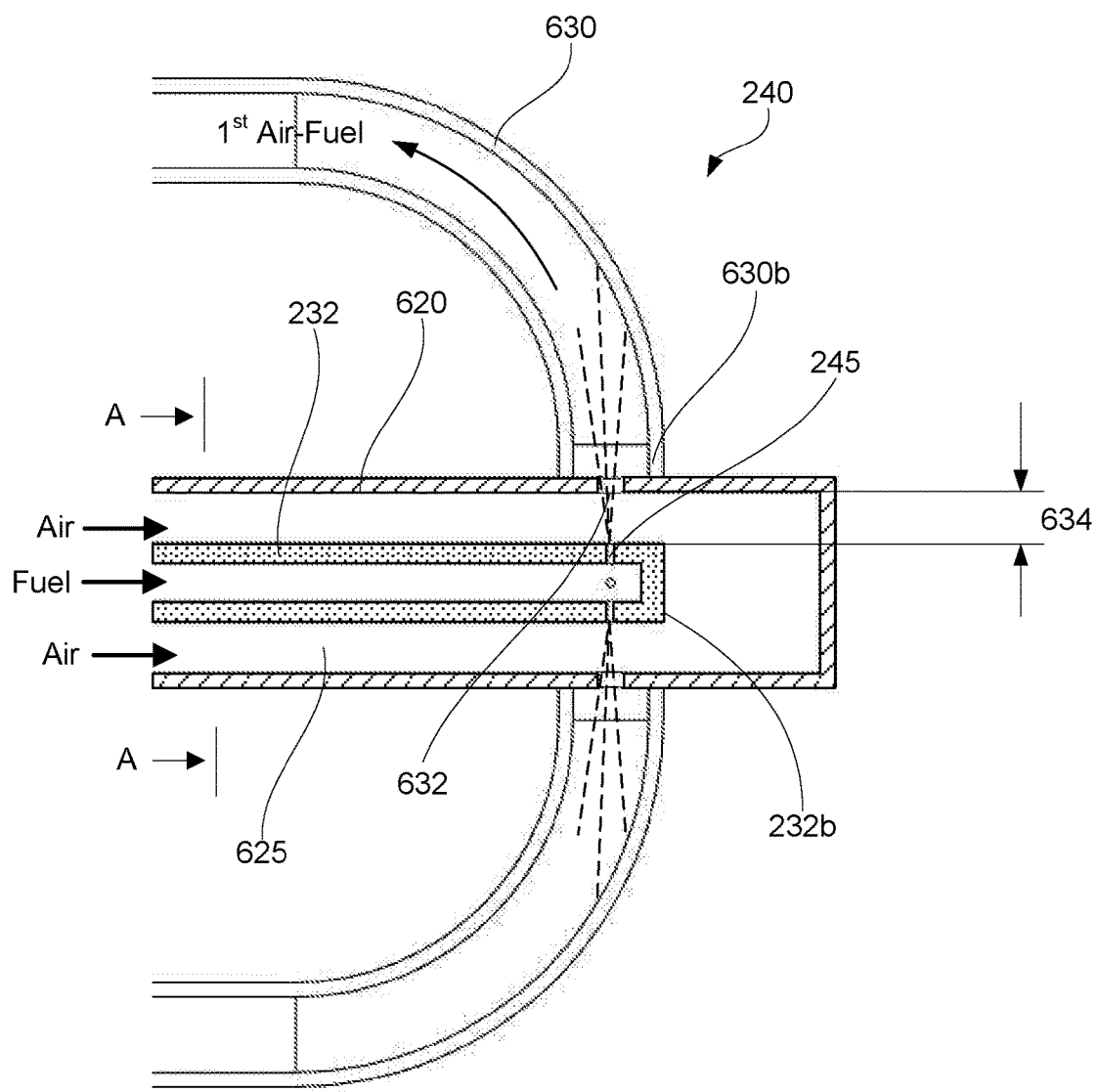
FIG. 3B is schematic expanded view showing various aspects of a fuel supply line, heat shield, and return line of the evaporator shown in FIG. 3A, in accordance with some examples.

In some examples, e.g., shown in FIGS. 3A and 3B, combustor 250 is integrated with integrated evaporator 240 into one unit. Specifically, evaporator 240 is positioned in chamber 600 of combustor 250. The heat produced during burning is used to evaporation and heating of the fuel, e.g., thorough controlling temperatures of the fuel in various parts of evaporator 240. This temperature control is used to prevent coking of the fuel and to generate an air-fuel mixture with specific temperature and concentration characteristics as will now be described in more detail with reference to FIGS. 3A and 3B.

Referring to an example presented in FIG. 3A, combustor 250 comprises comprising chamber 600, base 610, and evaporator 240. Base 610 comprises fuel inlet 612 and first air inlet 614. Evaporator 240 may be supported by base 610 and extend into chamber 600 as, for example, shown in FIG. 3A. Chamber 600 is used for burning the fuel. Specifically, the fuel may be supplied into chamber 600 through combustor injector 252, in some examples, as a part of an air-fuel mixture. In some examples, additional air may be supplied into chamber 600 to initiate the burning of the fuel in chamber 600. Various operating aspects of burning the fuel in chamber 600 will be understood by one having ordinary skills in the art. Combustor injector 252, supplying an air-fuel mixture for burning, is different from fuel injector 245 used for supplying the fuel for evaporating, heating, and mixing with air to form the air-fuel mixture.

Referring to FIG. 3A, combustor 250 or, more specifically, evaporator 240 comprises fuel supply line 232 and return line 630. Fuel supply line 232 may be enclosed into heat shield 620, which thermally isolates fuel supply line 232 from the flame in chamber 600. Fuel supply line 232 comprises first supply line end 232a, second supply line end 232b, and fuel injector 245 positioned at second supply line end 232b. First supply line end 232a is connected to base 610. More specifically, first supply line end 232a may extend through base 610 as, for example, shown in FIG. 3A. Fuel supply line 232 is in fluid communication with fuel inlet 612 of base 610. In some examples, first supply line end 232a is operable as fuel inlet 612 of base 610.

Return line 630 comprises first return line end 630a, second return line end 630b, and fuel-receiving opening 632 at second return line end 630b. First return line end 630a is connected to base 610. Fuel-receiving opening 632 is facing fuel injector 245 and separated by fuel transfer gap 634 from fuel injector 245 as, for example, schematically shown in FIG. 3B. Combustor injector 252 is in fluid communication with return line 630. Combustor injector 252 may be directed at least in part at return line 630 to ensure burning of the fuel around return line 630 and heating of return line 630. Combustor injector 252 may disposed on base 610, return line 630, or both.

Both fuel supply line 232 and return line 630 (and heat shield 620, if one is used) extend through chamber 600 of combustor 250. The position of fuel supply line 232 and return line 630 in chamber 600 may be selected such that sufficient heating of return line 630 is achieved, at least sufficient heating of a portion of return line 630 connected to fuel supply line 232. For example, this portion of return line 630 may be positioned in the hottest point within chamber 600. Heating of return line 630 ensures that the fuel is evaporated in return line 630 without burning (the concentration of fuel in the air, if any, is too rich for burning) and without coking.

As shown in an exampled illustrated in FIG. 3A, fuel supply line 232 extends through chamber 600 inside heat shield 620. Heat shield 620 thermally insulates fuel supply line 232 from the heat produced in chamber 600. This allows to keep the temperature of fuel supply line 232 below the coking temperature. Specifically, the temperature of fuel supply line 232 may be less than 300° C., less than 250° C. or even less than 200° C. The coking temperature may depend on the fuel type, material of fuel supply line 232, and other factors. In some examples, fuel supply line 232 is formed from iron-nickel alloy, such as INCONEL®, which has good corrosion resistance to different types of fuel, especially at high temperatures.

Heat shield 620 comprises first heat shield end 620a and second heat shield end 620b. Heat shield 620, when present, encloses fuel supply line 232 such that heat shield 620 is separated from fuel supply line 232 by at least heat shield gap 625. Heat shield gap 625 may extend between first heat shield end 620a and second heat shield end 620b. Heat shield gap 625 may be in fluid communication with first air inlet 614 and with fuel-receiving opening 632 of return line 630. In some examples, heat shield 620 and fuel supply line 232 are concentric.

Figure 3C:
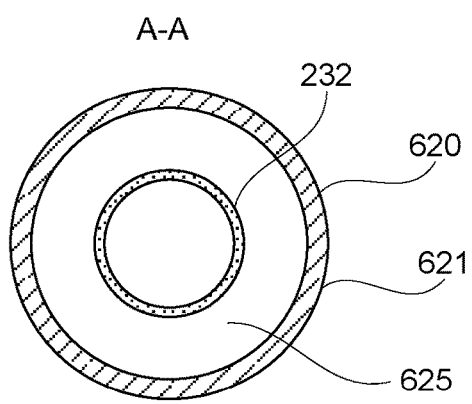
FIGS. 3C and 3D are schematic cross-sectional views of two examples of the fuel supply line and the heat shield shown in FIG. 3B, in accordance with some examples.
Figure 3D:
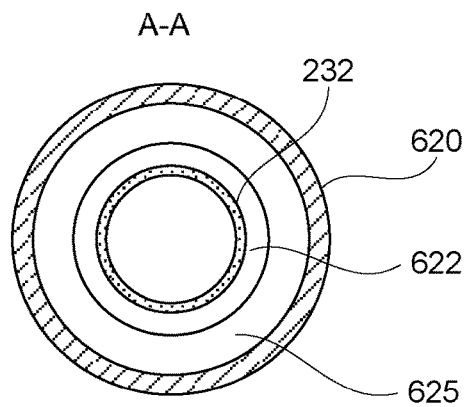

Heat shield 620 may be a hollow tube with fuel supply line 232 positioned inside heat shield 620 as, for example, schematically shown in FIGS. 3C and 3D. During the steady state operation, exterior surface 621 of heat shield 620 is exposed to the flame in chamber 600 and can be at any temperature, such as between about 250° C. and 1000° C., depending on the type of the fuel, type of oxidant, and burning conditions. The thermal insulation may be provided by heat shield gap 625 between heat shield 620 and fuel supply line 232. In some examples, air may be flown in heat shield gap 625 from compressed air inlet 242 of heat shield 620 to return line 630 to provide cooling to heat shield 620 and fuel supply line 232. If the air is flown, then the flow rate of the air may be such that the concentration of fuel in the air-fuel mixture formed in return line 630 is such that the mixture is too rich to burn (e.g., the concentration is above the upper flammability limit). Alternatively, no air may be flown in heat shield 620. Furthermore, the fuel flow through fuel supply line 232 provides additional cooling to fuel supply line 232. The fuel may operate as a heat sink while it flows through fuel supply line 232. For example, when the fuel enters fuel supply line 232, the temperature of the fuel may be between about −25° C. and 50° C. The fuel may be allowed to heat up to its coking temperature range while in fuel supply line 232. In some examples, when the fuel is dispensed from fuel injector 245 of fuel supply line 232, the temperature of the fuel may be between about 150° C. and 250° C. or, more specifically, between 200° C. and 225° C.

Heat shield 620 may be made, for example, from iron-nickel alloy, such as INCONEL®. In some examples, heat shield gap 625 between heat shield 620 and fuel supply line 232 may be at least partially filled with a heat insulating material. For example, FIG. 3D illustrate heat insulator 622 interfacing fuel supply line 232 and retaining heat shield gap 625 between heat insulator 622 and heat shield 620. Alternatively, in some examples, heat insulator 622 interfaces heat insulator 622 such that heat shield gap is retained between and heat insulator 622. In some examples, no heat shield gap is retained and the entire space between heat shield 620 and fuel supply line 232 is filled with heat insulator 622. When heat shield gap 625 is retained, heat shield gap 625 may be used to deliver air to return line 630 as further described below. Alternatively, heat shield gap 625 between heat shield 620 and fuel supply line 232 may be evacuated and may have a pressure of less than 1 Torr or even less than 0.1 Torr.

Fuel supply line 232 comprises fuel injector 245 at the end of fuel supply line 232, which extends into chamber 600. When return line 630 is heated to its operating temperature either by the flame in chamber 600 or using a preheating cycle further described below, fuel injector 245 delivers the fuel into return line 630. The delivered fuel may be partially pre-heated in fuel supply line 232. At the time of passing fuel injector 245, the temperature of the fuel is less than its coking temperature, which precludes coking of the fuel in fuel supply line 232 and, specifically, in fuel injector 245.

In some examples, the fuel is delivered into return line 630 together with air supplied through heat shield 620. The air may be preheated as it flows through heat shield 620. The temperature of the air supplied into return line 630 may be greater than the coking temperature range of the fuel. In some examples, the temperature of the air may be between about 250° C. and 1000° C.

When the air is combined with the fuel in return line 630, the concentration of the fuel is above the upper flammability limit for this fuel. As such, no burning occurs in return line 630. This combination of the air and fuel may be referred to as a first air-fuel mixture. In some examples, no air is delivered to return line 630.

Return line 630 may be a hollow tube made, for example, from iron-nickel alloy, such as INCONEL®. Return line 630 is heated by the flame in chamber 600 or pre-heated during the preheating cycle. In some examples, a portion of return line 630 connected to heat shield 620 and open to fuel injector 245 is at a temperature above the coking range of the fuel, such as at least about 750° C. or even at least about 900° C., at least when the fuel is delivered into return line 630. As such, when the fuel contacts the interior wall of return line 630, coking does not occur and/or any coking residue immediately decomposes and the decomposition products are carried away by the first air-fuel mixture.

Overall, the fuel first contacts fuel supply line 232, which is held at a temperature below the coking temperature range. The fuel is then delivered to and contacts return line 630, which is help at a temperature above the coking temperature range. As such, coking of the fuel does not occur in either one of these components since all components or, more specifically, all metal components contacting the fuel are either below the coking range or above the coking range.

To achieve this transition from below the coking temperature range to above this range and, also, to ensure that the temperature of return line 630 does not drop to the coking range when the fuel reaches return line 630 and evaporates inside return line 630, the fuel may be preheated in fuel supply line 232. Furthermore, in some examples, the fuel may be combined with air, carried in heat shield gap 625 between heat shield 620 and fuel supply line 232. This air may be heated to above the coking temperature range of the fuel. The air is combined with the fuel upon entering return line 630, thereby increasing the temperature of the fuel in the first air-fuel mixture. Furthermore, return line 630 is heated by the flame inside chamber 600 or pre-heated during the pre-heating cycle.

The first air-fuel mixture then flows through return line 630 to outlet 248. In this example, return line 630 may be also referred to as an evaporator intake manifold. Additional heating of the air-fuel mixture may occur in return line 630. In some examples, the temperature of the first air-fuel mixture at outlet 248 is between about 750° C. and 1200° C. or, more specifically between 900° C. and 1100° C. This new combination of air and fuel may be referred to as a second air-fuel mixture to distinguish it from the first air-fuel mixture. The fuel concentration in this second air-fuel mixture is within the combustible range (between the lower flammability limit and the upper flammability limit) and the second air-fuel mixture produces flame when it is directed into chamber 600. The flame is used to heat return line 630 and heat shield 620, in addition to supplying the exhaust into turbine 260.

Figure 5:
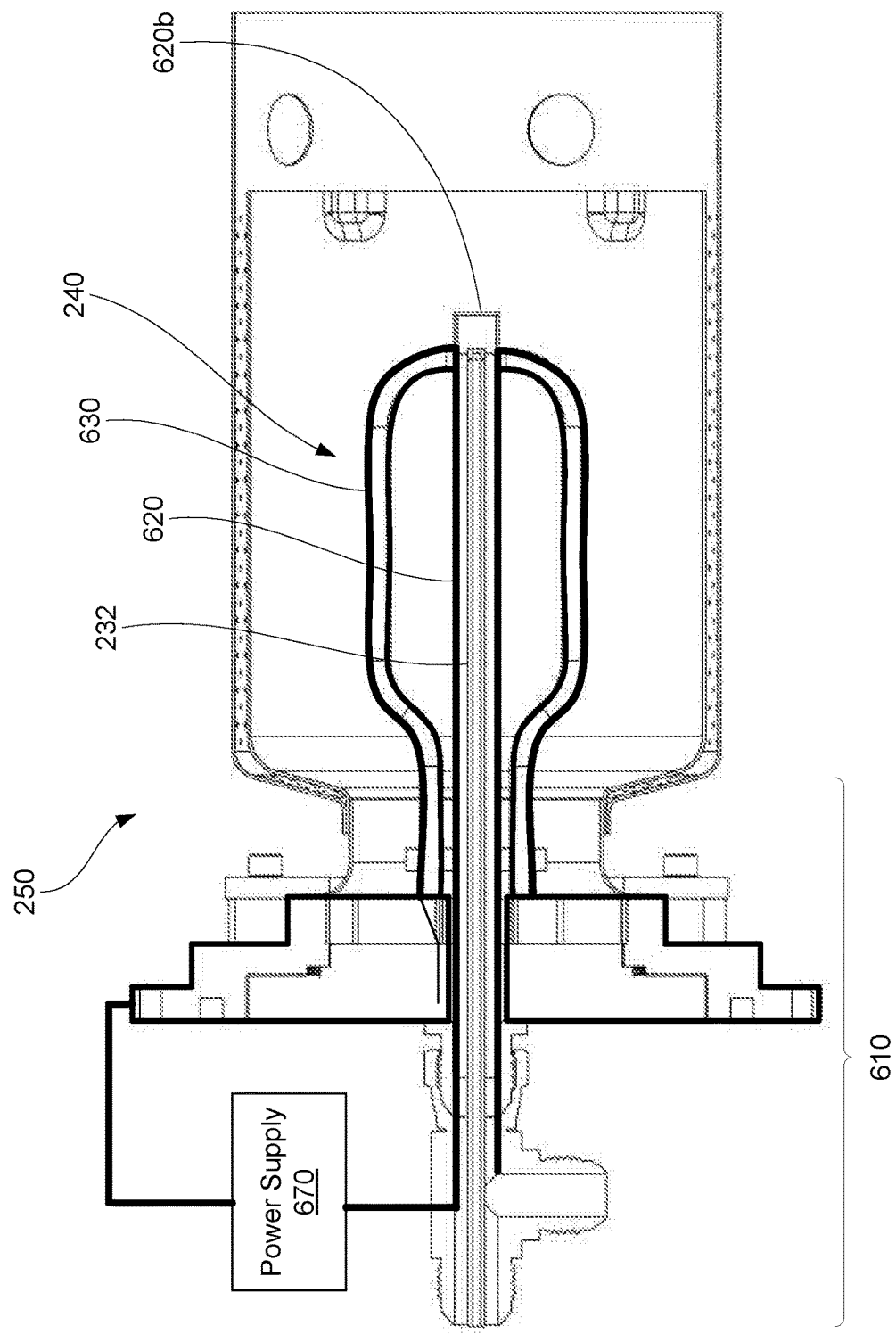
FIG. 5 is a schematic illustration of resistive heating of the heat shield and the return line to control the temperature of these components prior to initial burning in the combustor, in accordance with some examples.

As noted above, before burning occurs in chamber 600, return line 630 and, in some examples, heat shield 620 may be preheated during preheating cycle. In some examples, resistive heating for this purpose, in which heat shield 620 and return line 630 may be operable as resistive heating elements as, for example, schematically shown in FIG. 5. Specifically, power supply 670 may be connected to heat shield 620 and return line 630 (which are also interconnected in series by way of mechanical connection and second heat shield end 620b of heat shield) and supplying an electrical current through return line 630 and heat shield 620 thereby causing return line 630 and heat shield 620 to resistively heat. The materials, sizes of return line 630 and heat shield 620, additional electrical connections, air flows, and other factors may be selected to achieved certain temperatures at each component, e.g., heating a portion of return line 630 connected to heat shield 620 to at least about 700° C. before introducing the fuel into this portion. As such, the resistive heating may be specifically configured to achieve temperatures similar to ones when the flame is present in chamber 600.

The resistive heating may be performed prior to introducing any fuel into fuel supply line 232 and, in some examples, air into heat shield 620. In some examples, air may be flown into heat shield 620 for controlling the temperature of fuel supply line 232. Fuel supply line 232 may or may not be resistively heated while resistively heating return line 630.

Figure 4A:
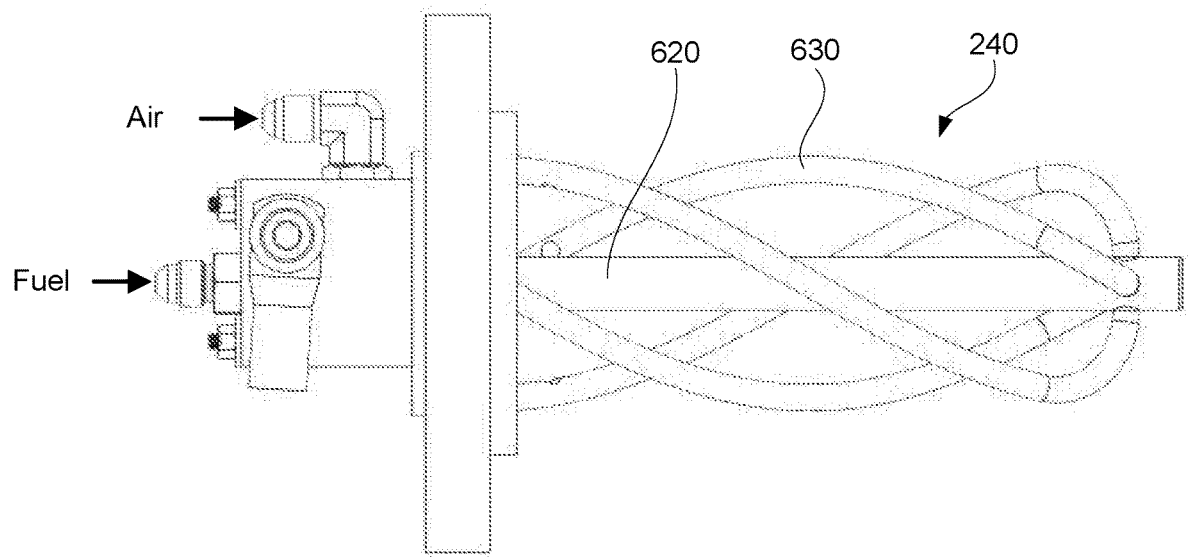
FIGS. 4A and 4B are schematic illustrations of additional examples of a combination of an evaporator and a combustor for use in a turbine engine, in accordance with some examples.
Figure 4B:
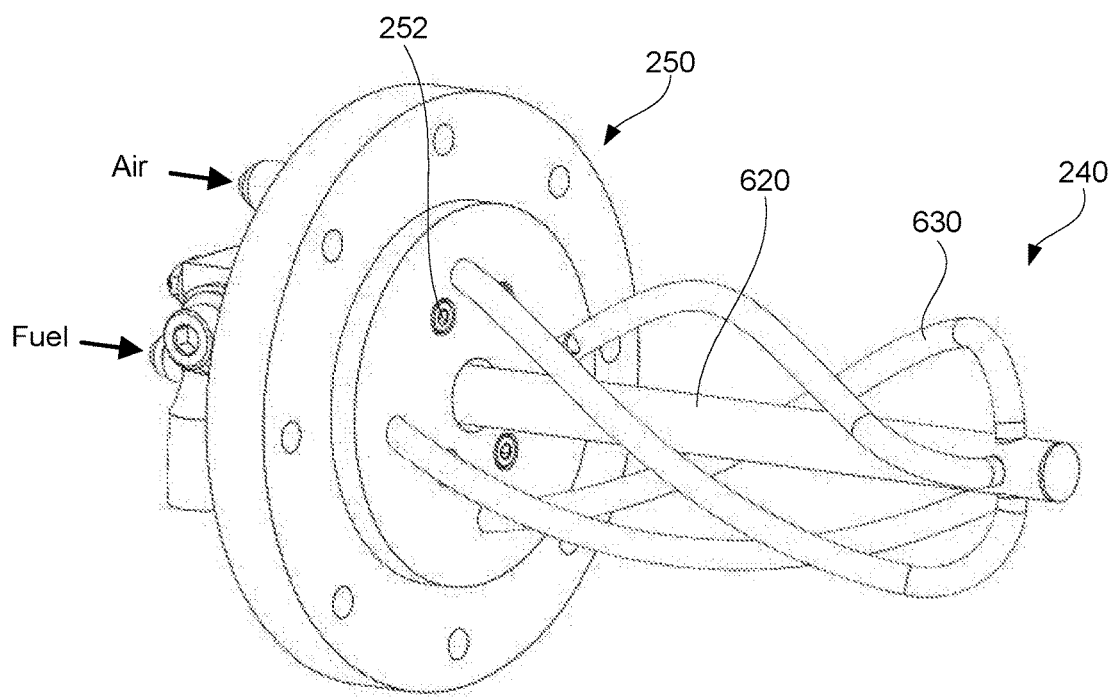

FIGS. 4A and 4B are schematic illustrations of another example of evaporator 240. In this example, return line 630 has a spiral shape. In other words, return line 630 may swirl around heat shield 620 and may turn between 90° and 360° around heat shield 620. This shape may assist with aerodynamics, heat transfer (e.g., return line 630 having a longer length than the example in FIG. 2D, for the same length of heat shield 620), and allow for more thermal expansion without stressing connection joints.

Returning to FIG. 2A, in some examples, evaporator 240 is thermally coupled to heater 290 or heater 290 is a part of evaporator 240. For example, heater 290 is used to maintain the temperature of one or more walls 246 of evaporator 240 above the coking temperature range. For example, heat may be supplied to evaporator 240 to ensure fuel evaporation and/or to compensate for any cooling, e.g., associated with a pressure drop (if any) in the compressed air as it enters evaporator 240. Furthermore, heater 290 may be used for preheating and before turbine engine 200 is a full operating mode. In some examples, evaporator 240 is equipped with at least one of a temperature sensor, fuel concentration sensor, flow meter, and other like sensors.

Combustor 250 is coupled to evaporator 240 using, e.g., a manifold. In some examples, the manifold is connected to outlet 248 of evaporator 240 and carries the air-fuel mixture from evaporator 240 to combustor 250. It should be noted that the temperature of the air-fuel mixture, as the air-fuel mixture travels through the manifold, is higher than the coking temperature range.

Combustor 250 is also coupled to recuperator 270 and receives the compressed air in addition to the air-fuel mixture received from evaporator 240. In some examples, the fuel is only provided (in the form of the air-fuel mixture) from evaporator 240. In the same examples, recuperator 270 provides only compressed air and no fuel. The air-fuel mixture from evaporator 240 is combined with the compressed air received from recuperator 270 is combined only inside combustor 250. This approach allows maintaining the fuel concentration of the air-fuel mixture above the upper flammability limit and even above the flash point, while supplying the air-fuel mixture from evaporator 240 to combustor 250. As a result, the fuel does not burn in a manifold connecting evaporator 240 to combustor 250. When the air-fuel mixture is combined with the compressed air in combustor 250, the fuel concentration drops to the flammability range resulting in burning. An exhaust is generated as a result of this burning. The exhaust is directed to turbine 260 causing it to rotate.

As shown in FIG. 2A, turbine engine 200 further comprises recuperator 270, which is optional in some examples. Recuperator 270 is fluidically coupled to compressor 210 and combustor 250. Specifically, recuperator 270 receives a portion of the compressed air, generated by compressor 210. Recuperator 270 receives further heats this portion of the compressed air and then directs this heated portion of the compressed air to combustor 250. Recuperator 270 is also fluidically coupled to turbine 260. It should be noted that this fluidic coupling is separate from the one described above with reference to compressor 210 and combustor 250. Specifically, recuperator 270 receives the exhaust from turbine 260 and transfers the heat from this exhaust to the portion of the compressed air, passing through recuperator 270. In other words, recuperator 270 captures the heat from the exhaust that would have been otherwise wasted to the environment and delivers that heat to the portion of the compressed air.

In some examples, turbine engine 200 further comprises controller 280 operable to control various operations of turbine engine 200 as further described below with reference to FIGS. 6 and 7. For example, controller 280 may control heater 290, fuel supply 230, and evaporator 240, e.g., to maintain the fuel concentration in the air-fuel mixture within a predetermined range, to maintain the temperature of the fuel before forming the air-fuel mixture, and to maintain the temperature of the air-fuel mixture while carrying the air-fuel mixture from evaporator 240 to combustor 250.

Examples of Method for Controlling Air-Fuel Mixture in Turbine Engines

Figure 6:
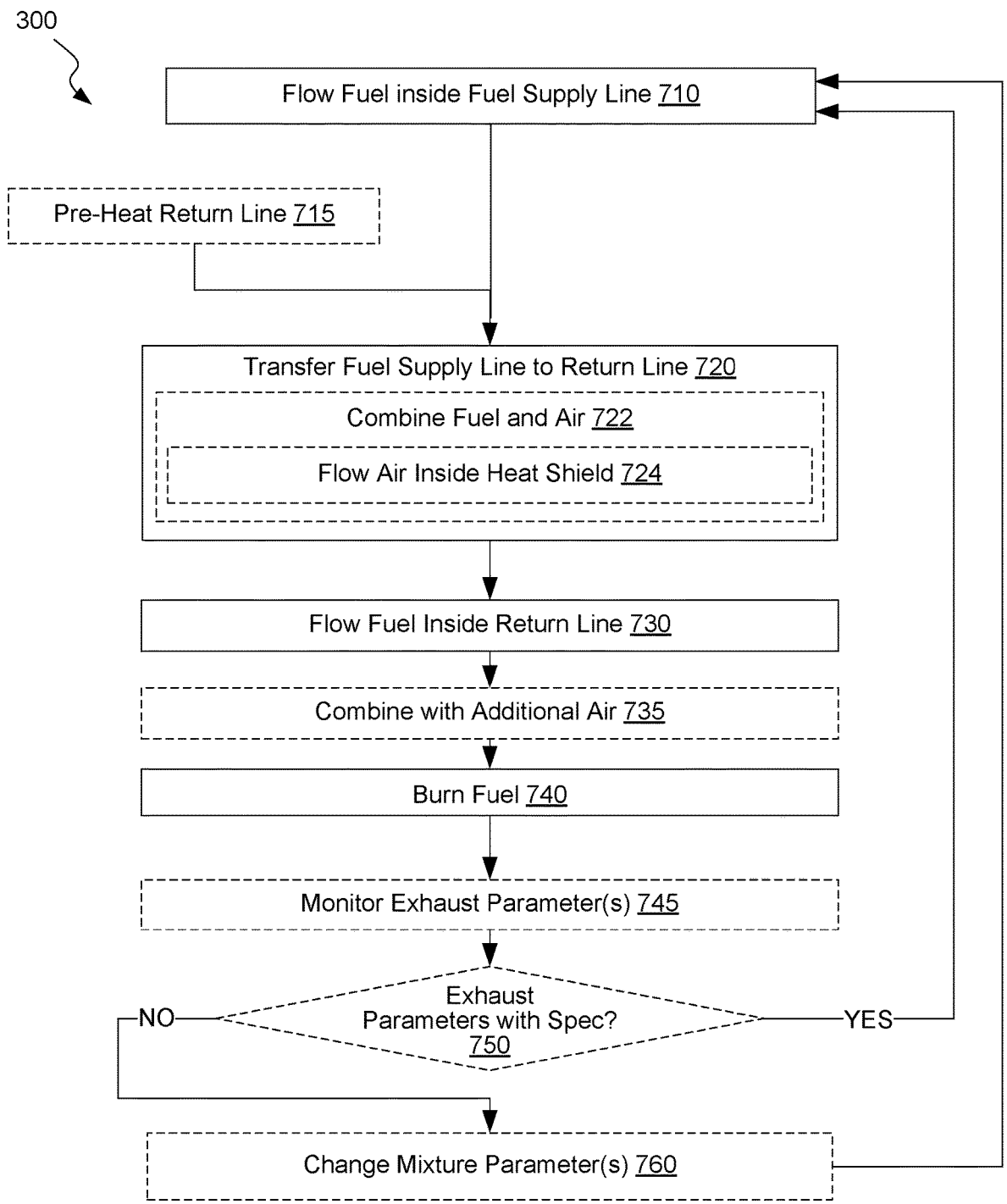
FIG. 6 is a process flowchart corresponding to an example of a method for controlled evaporation and heating of fuel in a turbine engine.

FIG. 6 is a process flowchart corresponding to one example of method 300 for controlled evaporation and heating of the fuel for burning in a turbine engine, in accordance with some examples. In this example, method 300 may comprise flowing the fuel inside fuel supply line 232 (block 710). The temperature of fuel supply line 232 is maintained below the coking temperature range of the fuel (e.g., controlling a flow rate of the fuel in the fuel supply line and/or controlling a flow rate of air inside a head shield surrounding the fuel supply line).

In some examples, prior to transferring the fuel from fuel supply line 232 to return line 630, method 300 involves preheating return line 630 to the temperature above the coking temperature range (block 715). In some examples, this operation (block 715) comprises resistive heating, such as passing an electrical current through the return line.

Continue with the example presented in FIG. 6, method 300 proceeds with transferring the fuel from fuel supply line 232 to return line 630 (block 720). During this operation (block 720), the fuel passes through fuel transfer gap 634 between fuel supply line 232 and return line 630. The temperature of return line 630 is maintained above the coking temperature range of the fuel.

In some examples, transferring the fuel from fuel supply line 232 to return line 630 (block 720) comprises combining the fuel with air (block 722), thereby forming an air-fuel mixture. In these examples, flowing the fuel inside return line 630 (during later operation describes below) comprises flowing the air-fuel mixture inside return line 630. The fuel concentration in the air-fuel mixture may be above an upper flammability limit.

In these examples, method 300 may further comprise flowing the air inside heat shield 620 (block 724). As described above, heat shield 620 encloses fuel supply line 232. Furthermore, heat shield 620 is connected to return line 630. A portion of heat shield 620 connected to return line 630 (e.g., second heat shield end 620*b*) is maintained at the temperature above the coking temperature range of the fuel.

Continue with the example presented in FIG. 6, method 300 proceeds with flowing the fuel inside return line 630 to outlet 248 in return line 630 (block 730). In some examples, the temperature of the fuel is above a flash point when the fuel reaches outlet 248 in return line 630 or, more specifically, the temperature of the fuel may be above the ignition temperature. Furthermore, the fuel may be substantially gas when the fuel reaches outlet 248 in return line 630.

Continue with the example presented in FIG. 6, method 300 may comprise combining the air-fuel mixture with additional air (block 735), thereby forming an additional air-fuel mixture. This operation (block 735) is performed prior to burning the fuel (which may be already a part of the air-fuel mixture) in combustor 250. Furthermore, this operation (block 735) may form an additional air-fuel mixture having a concentration of the fuel within a flammability range. In some examples, one or more of the air or the additional air is flown in the heat insulator from one or more of a diverter or a recuperator.

Continue with the example presented in FIG. 6, method 300 proceeds with burning the fuel of the air-fuel mixture in combustor 250 (block 740), thereby producing exhaust. In these examples, the temperature of return line 630 is maintained above the coking temperature range, at least in part, by burning the fuel in combustor 250.

Continue with the example presented in FIG. 6, method 300 may comprise monitoring one or more exhaust parameters (block 745). Furthermore, method 300 may comprise controlling one or more parameters, e.g., e.g., flow rate of the fuel, a flow rate of the air, or a flow rate of the additional air, (block 760) based on the one or more exhaust parameters (decision block 750). The one or more exhaust parameters are selected from the group consisting of a concentration of nitrogen oxide in the exhaust, a concentration of carbon monoxide in the exhaust, and a concentration of hydrocarbons in the exhaust.

Figure 7:
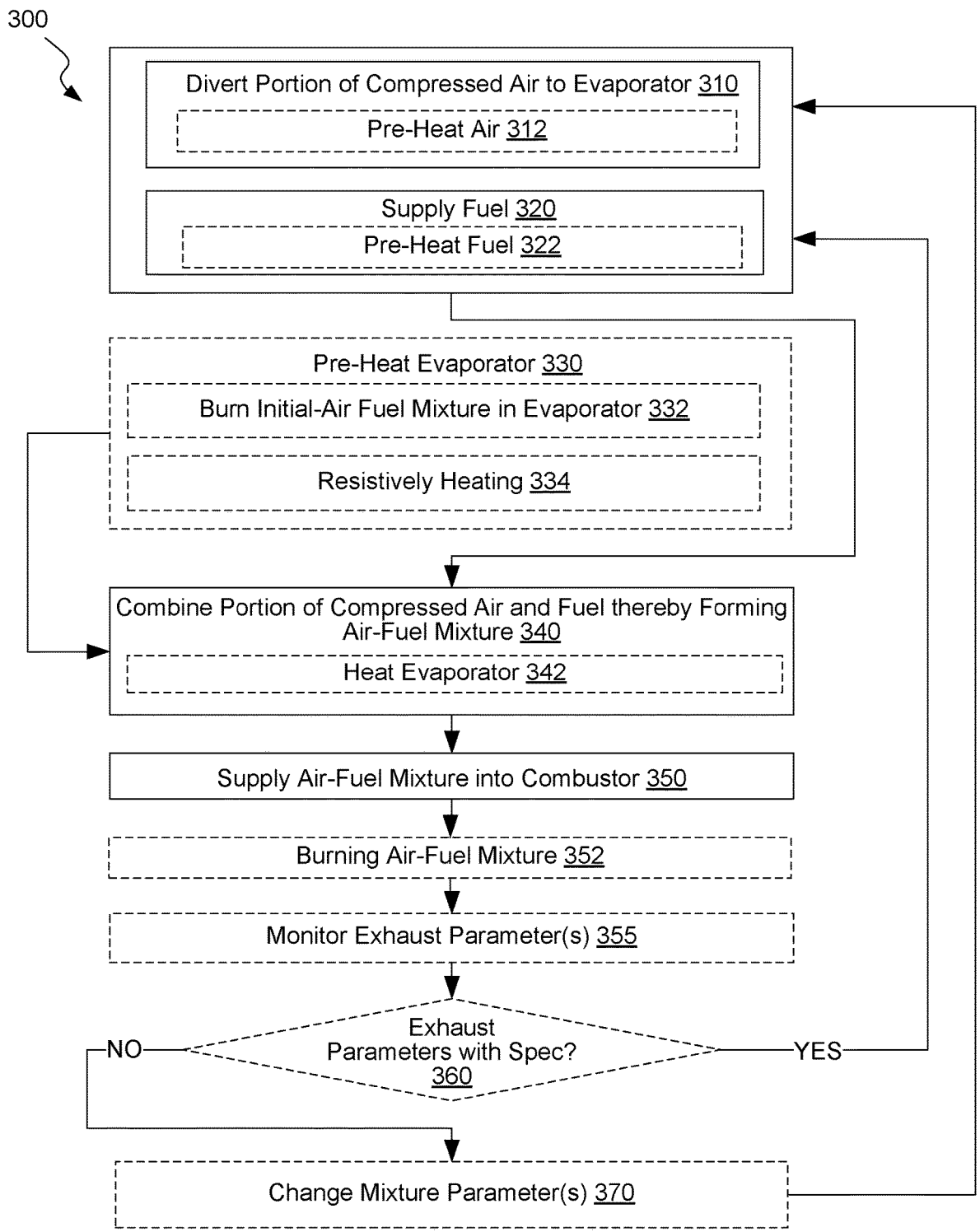
FIG. 7 is a process flowchart corresponding to another example of the method for controlled evaporation and heating of the fuel in the turbine engine.

FIG. 7 is a process flowchart corresponding to another example of method 300 for controlled evaporation and heating of the fuel for burning in a turbine engine, in accordance with some examples. Various examples of the turbine engine are described above with reference to FIG. 2A.

Referring to FIG. 7, method 300 comprises diverting a portion of the compressed air received from the compressor to the evaporator (block 310). For example, a diverter may be used for this operation. The diverter comprises an adjustable flow divider that can change its position resulting in different portions of the compressed air directed to the evaporator. In some examples, this portion varies at different stages of method 300.

In some examples, the portion of the compressed air diverted from the compressor into the evaporator varies based on the amount of fuel supplied into the evaporator. For example, the fuel concentration in the air-fuel mixture may be maintained at a particular value or within a particular range, e.g., to ensure desired exhaust conditions as further described below.

Referring to FIG. 7, in some examples, the portion of the compressed air directed to the evaporator is pre-heated as shown by optional block 312. It should be noted that this portion is pre-heated before contacting the fuel. Pre-heating the compressed air allows for a more rapid evaporation and reducing the likelihood of fuel coking in the evaporator. For example, the compressed air may be preheated while passing through the transfer manifold.

Referring to FIG. 7, method 300 also involves supplying a liquid fuel into the evaporator (block 320). The liquid fuel may be selected from the group consisting of diesel and jet fuel. The liquid fuel may be supplied into the evaporator using one or more fuel injectors. Furthermore, the liquid fuel may be diverted away from walls of the evaporator while supplying the liquid fuel into the evaporator to avoid coking.

It should be noted that all liquid fuel may pass through the evaporator before being supplied into the combustor. The amount of the liquid fuel may be controlled and changed during different stages on method 300. For example, controlling the amount of the liquid fuel may be used to control the fuel concentration in the air-fuel mixture as further described below with reference to FIG. 8. In some examples, this control is achieved by changing the amount of the liquid fuel, while the amount of the compressed air directed to the evaporator may be constant. Alternatively, both the mount of compressed air and the amount of liquid fuel delivered to the evaporator are controlled and may be changed to achieve a desired fuel concentration in the air-fuel mixture.

Referring to FIG. 7, in some examples, the liquid fluid supplied to the evaporator is pre-heated as shown by optional block 322. It should be noted that this liquid fuel is pre-heated before contacting the compressed air. For example, the liquid fluid may be initially supplied at an ambient temperature (e.g., depending on the operating environment) and then preheated before supplying it onto the evaporator. Pre-heating the liquid fluid allows for its rapid evaporation once it is delivered into the evaporator and combined with the compressed air. The liquid fuel may be preheated while passing through the fuel supply line. It should be noted that the temperature of the liquid fuel may not exceed its coking temperature at least while the liquid fluid is still in contact with any metal surfaces, e.g., the fuel supply line, fuel injectors or walls of the evaporator.

In some examples, prior or while supplying the compressed air and/or liquid fluid into the evaporator, the evaporator may be preheated as shown by optional block 330. This pre-heating may be used to ensure that substantially all (e.g., more than 95% by weight) of the liquid fluid is converted into the gas phase when the liquid fluid is later combined with the compressed air in the evaporator. For example, the wall of the evaporator may be preheated, which may be referred to an operating temperature of the evaporator. Once preheated, this temperature may be maintained in the evaporator by supplying additional heat directly to the evaporator and/or by pre-heating the compressed air and/or the liquid fluid supplied into the evaporator.

In some examples, the evaporator is preheated using, for example, a heater. In the same or other examples, the evaporator is pre-heated by flowing the hot compressed air through the evaporator. Furthermore, the evaporator may be pre-heated by burning an initial air-fuel mixture in the evaporator as shown by optional block 332 and will now be described in more detail with reference to FIG. 8.

Figure 8:
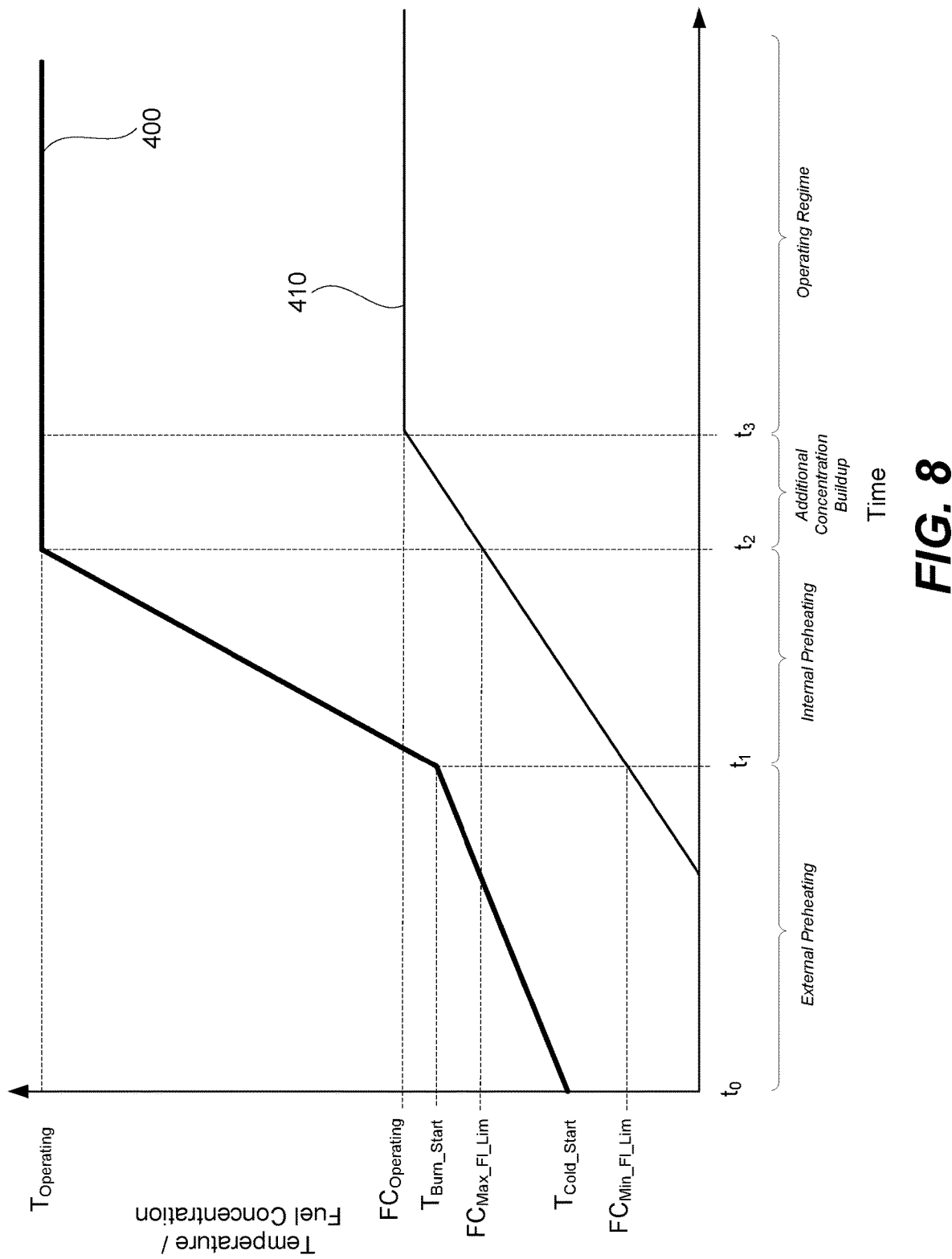
FIG. 8 illustrates temperature and fuel concentration plots for different operating regimes in a turbine engine, in accordance with some examples.

FIG. 8 illustrates a temperature profile and a fuel concentration profile in the evaporator during different operating regimes, in accordance with some examples. At the beginning (to), before the turbine engine is running, the evaporator temperature may be the same as the ambient temperature. This temperature is schematically identified as $T_{Cold\_Start}$ in FIG. 8. At this temperature, the evaporator may not be used and external pre-heating may be needed first. This preheating is between $t_0$ and $t_1$ and corresponds to the temperature increasing from $T_{Cold\_Start}$ to $T_{Burn\_Start}$. It should be noted that at some point during this initial $t_0$-$t_1$ period, the liquid fluid may be supplied into the evaporator. However, the fuel concentration in the air-fuel mixture during this period may be less than lower flammability limit ($FC_{Min\_Fl\_Lim}$) and no burning of the fluid may occur. For example, the fuel concentration may be gradually increased at least during the part of this period. At $t_1$, the fuel concentration reaches the lower flammability limit ($FC_{Min\_Fl\_Lim}$), and the burning inside the evaporator may start. This burning results in further increase of the evaporator temperature between $t_1$ and $t_2$. This burning inside evaporator may be referred to an internal preheating. It may be a temporary process that continues until the temperature reaches the operating level ($T_{Operating}$) at which point, the fuel concentration exceeds the upper flammability limit ($FC_{Max\_Fl\_Lim}$) and further burning inside the evaporator stops. The fuel concentration may be gradually increased during this $t_1$-$t_2$ period (the internal preheating) as, for example, schematically shown in FIG. 8. Even though the fuel concentration changes, the fuel concentration is within the flammability range, i.e., between the lower flammability limit ($FC_{Min\_Fl\_Lim}$) and the upper flammability limit ($FC_{max\_Fl\_Lim}$).

In some examples, the fuel concentration may be controlled at some level between the lower flammability limit ($FC_{Min\_Fl\_Lim}$) and the upper flammability limit ($FC_{max\_Fl\_Lim}$) until the temperature reaches the operating level ($T_{Operating}$), rather than gradually increasing the concentration as shown in FIG. 8. This fuel concentration may be controlled, for example, based on the exhaust parameters (e.g., to minimize the pollutant in the exhaust while staying within the flammability range.

It should be noted that the upper flammability limit ($FC_{Max\_Fl\_Lim}$) may be less than the operating fuel concentration, and the concentration may continue to increase after $t_2$ until it reaches the operating level ($FC_{Operating}$) at $t_3$. Specifically, at $t_3$, the turbine engine enters its operating regime, and the evaporator temperature may be maintained at the operating level ($T_{Operating}$). The fuel concentration may be maintained at the operating level ($FC_{Operating}$) starting at $t_3$. It should be also noted that an external heater may continue to supply heat to the evaporator during internal preheating and/or while in the operating regime. Alternatively, no external heat may be supplied to the evaporator during the internal preheating stage.

In some examples, the external preheating may be avoided if the initial temperature ($T_{Cold\_Start}$) is sufficient to proceed directly with the internal preheating by burning fuel in the evaporator. Finally, even though FIG. 8 illustrates, the temperature and/or fuel concentration operating levels being constant, in some examples, the temperature and/or fuel concentration operating levels may change. When the temperature operating level needs to be increased, the turbine engine may temporary and/or partially return to the internal preheating regime.

Overall, preheating the evaporator may involve burning an initial air-fuel mixture in the evaporator. The fuel concentration in the initial air-fuel mixture may be less than the fuel concentration in the air-fuel mixture formed later. This ensures that the initial air-fuel mixture can burn in the evaporator, while the air-fuel mixture formed later (during the operator stage) does not burn in the evaporator. As such, once the evaporator temperature reaches its operating level, the fuel concentration may be increased to the operating level and to avoid future burning in the evaporator. In some examples, burning the initial air-fuel mixture in the evaporator is performed while increasing the fuel concentration in the initial air-fuel mixture. For example, the fuel concentration of the air-fuel mixture may be gradually increased in the evaporator and pass through a burning zone during which the evaporator is preheated by burning the air-fuel mixture right in the evaporator.

Alternatively, the evaporator may be preheated using various components of the evaporator as an internal resistive heating (block 334). For example, a voltage may be applied to between the inlet end of the heat shield line and the outlet of the return line. In some examples, additional electrical connections may be present between the inlet end of the heat shield line and the outlet of the return line for more localized heating.

Method 300 may proceed with combining the diverted portion of the compressed air with the liquid fuel in the evaporator thereby forming an air-fuel mixture (block 340). During this operation (block 340), substantially no fuel (less than 5% by weight) may be burned in the evaporator. Furthermore, combining the diverted portion of the compressed air with the liquid fuel in the evaporator may be performed while substantially no liquid fuel (heated above the coking temperature) comes in contact with the walls of the evaporator. In some examples, the evaporator is heated while combining the portion of the compressed air with the liquid fuel in the evaporator as shown by optional block 342 in FIG. 8.

Method 300 may then proceed with supplying the air-fuel mixture into a combustor of the turbine engine (block 350). The fuel concentration in the air-fuel mixture formed in the evaporator may be above the upper flammability limit when supplying the air-fuel mixture into the combustor. Furthermore, the temperature of the air-fuel mixture may be above the flash point when supplying the air-fuel mixture into the combustor. In some examples, the temperature of the air-fuel mixture may be even above an ignition temperature when supplying the air-fuel mixture into the combustor.

The air-fuel mixture may be predominantly gas when supplying the air-fuel mixture into the combustor. In other words, the liquid fuel may be substantially evaporated in the evaporator. Specifically, at least 95% by weight of the fuel may be in the form of a gas.

The air-fuel mixture supplied into the combustor may generate flame (block 352). This flame may be used to heat various components of the evaporator, such as the return line of the evaporator and, in some examples, the heat shield of the evaporator.

In some examples, method further comprises changing one or more mixture parameters (block 370). Some examples of these mixture parameters include, but not limited to, a fuel concentration in the air-fuel mixture and a temperature of the air-fuel mixture. For example, changing these parameters may be performed based on monitoring one or more exhaust parameters in an exhaust generated while burning the air-fuel mixture in the combustor of the turbine engine as schematically shown by decision block 360. The monitored exhaust parameters are selected from the group consisting of a concentration of nitrogen oxide in the exhaust, a concentration of carbon monoxide in the exhaust, a concentration of hydrocarbons in the exhaust. In some examples, changing the one or more mixture parameters comprises at least one of operations selected from the group consisting of: (1) varying the portion of the compressed air diverted into the evaporator, (2) varying an amount of the liquid fuel supplied into the evaporator, (3) varying a temperature of the portion of the compressed air diverted into the evaporator, (4) varying a temperature of the liquid fuel supplied into the evaporator, and (5) varying the temperature of the air-fuel mixture.

Drivetrain Examples

Figure 9:
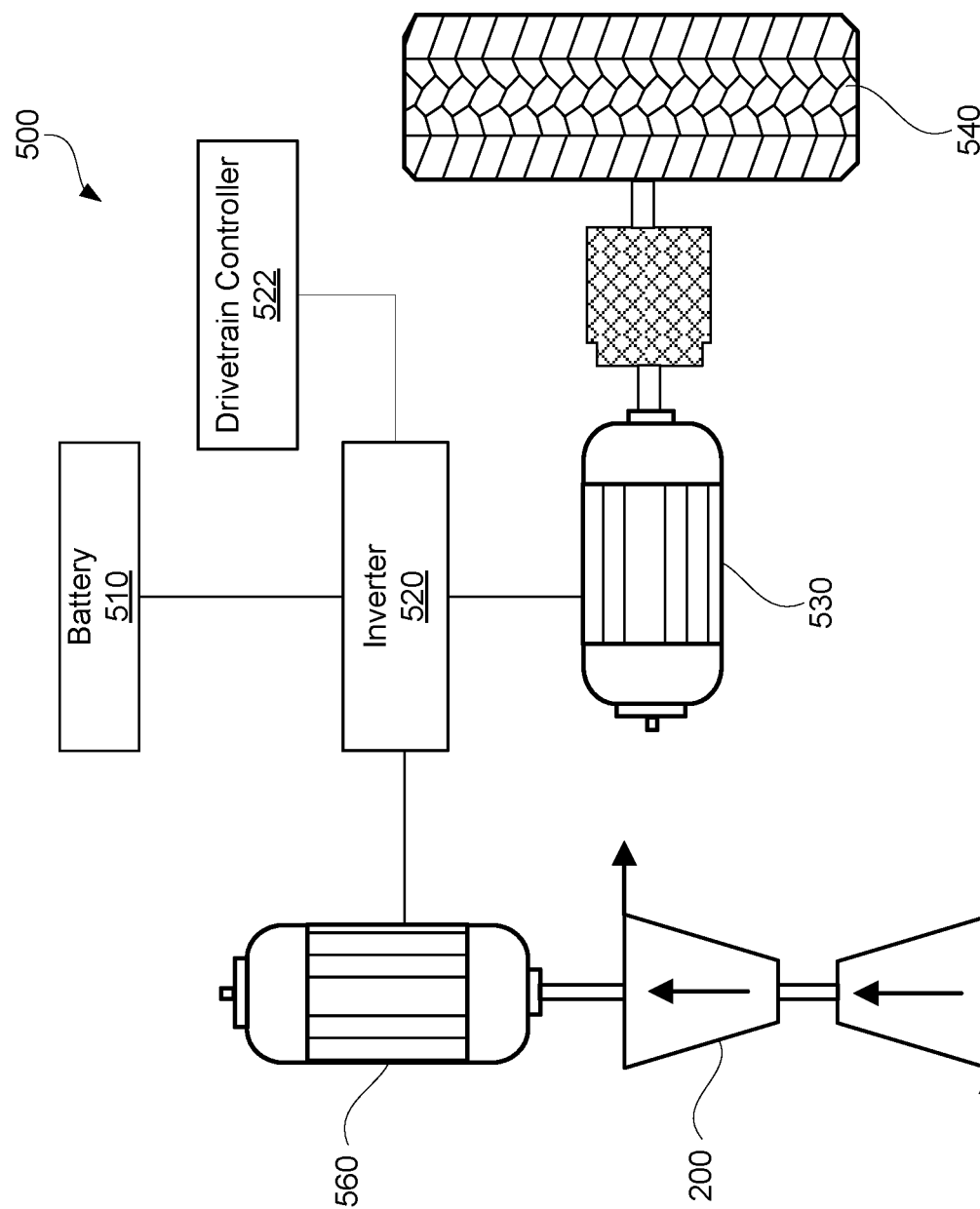
FIG. 9 is a schematic illustration of a vehicle drivetrain, comprising a turbine engine, in accordance with some examples.

FIG. 9 is a schematic illustration of electrical vehicle drivetrain 500 comprising turbine engine 200, in accordance with some examples. Other components of electrical vehicle drivetrain 500 include electrical generator 560 mechanically coupled to turbine engine 200, inverter 520 electrically coupled to electrical generator 560, battery 510 electrically coupled to inverter 520, and drive motor 530 also electrically coupled to inverter 520. Electrical vehicle drivetrain 500 may also include drivetrain controller 522, which control operation of inverter 520 and instructs inverter 520 to direct electrical currents among electrical generator 560, battery 510, and drive motor 530. Drivetrain controller 522 may include a controller of turbine engine 200. Alternatively, the controller of turbine engine 200 may be a component independent from drivetrain controller 522. During the operation of electrical vehicle drivetrain 500, a combination of turbine engine 200 and electrical generator 560 may be used as a range extender and supply electrical energy battery 510 (e.g., for recharging battery 510) and/or to drive motor 530 (to drive wheels 540).

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method for controlled evaporation and heating of fuel for burning in a turbine engine, the method comprising:
    flowing the fuel inside a fuel supply line, wherein a supply line temperature of the fuel supply line is maintained below a coking temperature range of the fuel; and
    transferring the fuel from the fuel supply line to a return line through a fuel transfer gap between the fuel supply line and the return line, wherein a return line temperature of the return line is maintained above the coking temperature range of the fuel; and
    flowing the fuel inside the return line to an outlet in the return line.

2. The method of claim 1, wherein a fuel temperature of the fuel is above a flash point when the fuel reaches the outlet in the return line.

3. The method of claim 1, wherein a fuel temperature of the fuel is above an ignition temperature when the fuel reaches the outlet in the return line.

4. The method of claim 1, wherein the fuel is substantially gas when the fuel reaches the outlet in the return line.

5. The method of claim 1,
    wherein transferring the fuel from the fuel supply line to the return line comprises combining the fuel with air thereby forming an air-fuel mixture, and
    wherein flowing the fuel inside the return line comprises flowing the air-fuel mixture inside the return line.

6. The method of claim 5, wherein a fuel concentration in the air-fuel mixture is above an upper flammability limit.

7. The method of claim 5, further comprising flowing the air inside a heat shield, wherein the heat shield encloses the fuel supply line.

8. The method of claim 7, wherein the heat shield is connected to the return line.

9. The method of claim 8, wherein a portion of the heat shield connected to the return line is maintained at a temperature above the coking temperature range of the fuel.

10. The method of claim 8, wherein a heat insulator is disposed between the heat shield and the fuel supply line.

11. The method of claim 5, further comprising burning the fuel of the air-fuel mixture in a combustor thereby producing an exhaust.

12. The method of claim 11, wherein the return line temperature of the return line is maintained above the coking temperature range, at least in part, by burning the fuel in the combustor, the return line extending through the combustor.

13. The method of claim 11, further comprising, prior to burning the fuel of the air-fuel mixture in the combustor, combining the air-fuel mixture with additional air forming an additional air-fuel mixture having a concentration of the fuel within a flammability range.

14. The method of claim 13, wherein one or more of the air or the additional air is flown in the heat insulator from one or more of a diverter or a recuperator.

15. The method of claim 13, wherein burning the fuel comprises monitoring one or more exhaust parameters and controlling a flow rate of the fuel, a flow rate of the air, or a flow rate of the additional air based on the one or more exhaust parameters.

16. The method of claim 1, further comprising, prior to transferring the fuel from the fuel supply line to the return line, preheating the return line above the coking temperature range.

17. The method of claim 16, wherein preheating the return line comprises resistive heating, the resistive heating comprises passing an electrical current through the return line.

18. The method of claim 1, wherein the supply line temperature of the fuel supply line is maintained below the coking temperature range, at least, by controlling a flow rate of the fuel in the fuel supply line.

19. The method of claim 1, wherein the supply line temperature of the fuel supply line is maintained below the coking temperature range further by controlling a flow rate of air inside a heat shield surrounding the fuel supply line.

* * * * *